Feb. 9, 1971  J. G. LEWIS ET AL  3,562,751
DISTANCE AND DIRECTION RADAR SYSTEM UTILIZING A PLURALITY
OF CATHODE RAY TUBES
Filed Oct. 3, 1952  7 Sheets-Sheet 1

INVENTORS
JOHN G. LEWIS
WILLIAM R. SAVERY
By Harry M. Saragnitz
Attorney

CATHODE RAY SELECTOR SWITCH

AMPLITUDE SELECTOR CIRCUIT

Fig. 9

INVENTORS
JOHN G. LEWIS
WILLIAM R. SAVERY
By
Harry M. Saragovitz
Attorney

INVENTORS
JOHN G. LEWIS
WILLIAM R. SAVERY
By Harry M. Daragovitz
Attorney

United States Patent Office 3,562,751
Patented Feb. 9, 1971

3,562,751
DISTANCE AND DIRECTION RADAR SYSTEM UTILIZING A PLURALITY OF CATHODE RAY TUBES
John Garvon Lewis and William Reginald Savery, Malvern, England, assignors to the Minister of Supply, London, England
Filed Oct. 3, 1952, Ser. No. 312,948
Int. Cl. G01s 7/06
U.S. Cl. 343—11   12 Claims This invention relates to radar and like systems in which pulse echo sounding is used to determine the distance of a body in space from a given point. The invention has particular reference to means for obtaining elevation and height data in such systems.

In radar systems in particular, it is desirable that, in addition to the detecting of a target and the measuring of its bearing and slant distance from the transmitter, it should be possible to determine the elevation and the vertical height of the target above a given reference plane, in this instance the earth's surface near the transmitter. Such determinations should also preferably not be affected by fading of the received echos.

It is accordingly an object of the present invention to provide a radar or like system of this kind.

According to the invention an apparatus for determining the elevation of a target reflecting radiation from a pulse transmitter comprises a plurality of echo detecting means each having a different elevational direction of maximum sensitivity, and comparison means adapted to enable amplitude comparison of signals from said echo-detecting means to be performed.

According to a feature of the invention rotating means are provided for said echo-detecting means so that the plane of the directions of maximum sensitivity is rotatable and the target may be caused to cross the plane, whereby the comparison means compares groups of signals, each group from a different echo-detecting means, during a target crossing.

According to a feature of the invention said comparison means is adapted to transmit an indication to one of a multiplicity of elevation channels each of which corresponds to a different target elevation said channel being selected according to the signals received from said echo-detecting means, and a different range zone selection means is associated with each elevation channel and adapted to segregate indications according to range zones determined according to the elevation corresponding to said channel so that the range zones of each range zone selection means correspond to a common group of height zones.

According to a particular feature of the invention said comparison means comprises an equal plurality of amplitude-azimuth displays each for displaying signals or groups of signals from one different one of the plurality of echo-detecting means.

According to an alternative, particular feature of the invention elevation determining means are provided, adapted to determine the elevation of a target according to the relative amplitudes of the signals or groups of signals from said echo detecting means. Said means may be conveniently arranged to compare said signals pulse by pulse to obtain values for the elevation and then an average value of the elevations so obtained or, alternatively to sum said signals in their groups and determine the elevation according to the ratio of the sum of the signals. The exact derivation of the elevation from such comparisons is arranged to take into account the law followed by the sensitivity response of the echo detecting means as the target crosses the plane.

According to another particular feature of the invention said comparison means comprises a cathode ray tube having a plurality of beam deflection plates connected to the outputs of said echo detecting means in such a manner that the deflection of the beam lies according to the relative values of the signals in said echo detecting means.

Conveniently four echo detecting means are provided having their directions of maximum sensitivity equally spaced in elevation in the plane and the signals therefrom are connected in order of elevation round the four deflecting plates of the cathode ray tube. The area of the face of the cathode ray tube is then divided into sectoral areas each of which corresponds to a given elevation of a displayed target. In order to use the face of the cathode ray tube more economically five echo detecting means may be provided and connected round the four deflector plates so that the echo detecting means of lowest and highest elevations are connected to the same deflector plate. Gating means are provided so that ambiguity may be removed to indicate when the signal on the deflector plate connected to the echo detecting means of lowest and highest elevations is due to the lowest or the highest elevation echo detecting means.

According to yet a further feature of the invention the face of the cathode ray tube is provided with a plurality of metal sector plates each sector plate being adapted to act as a collector plate and produce a signal when bombarded by the cathode beam, whereby the appearance of a signal on a given sector indicates the presence of a target at a given elevation.

According to a still further feature of the invention a gating means is associated with each sector plate and provides a sequence of gates to divide the signals in that sector into height zones according to the range indicated by the timing of the signal and the elevation corresponding to the sector, and a plurality of zone assembly means is provided, each adapted to receive the signals corresponding to a different given height zone from the appropriate range gate of each gating means.

According to the invention in a fundamental aspect an apparatus for giving an indication of the height of a target by reference to a plurality of height zones, comprises a plurality of echo-detecting means each having a different elevational direction of maximum sensitivity, each echo-detecting means feeding a different range zone selection means adapted to segregate signals according to range zones determined according to the elevational direction of its associated echo-detecting means so that the range zones of each range zone selection means correspond to a common group of height zones.

According to a feature of this aspect of the invention said range zone selection means comprises a linear range intensity-modulated display, photoelectric detecting means adapted to view said range intensity modulated display and to indicate when a signal appears within range zones arranged according to each elevation to correspond to a common series of given height zones. Height zone assembly means adapted to accept signals from the appropriate ranges of the photo-electric detecting means and assemble them in height zones according to the height zone in which the target from which they originated is situated.

According to an alternative feature of this aspect of the invention said range zone selection means comprises range gating means. Height zone assembly means may be provided as before.

In order that the invention may be made clear and to show how the invention may be carried into effect an embodiment of the invention will now be described and reference made to the accompanying drawings in which.

Figure 1:
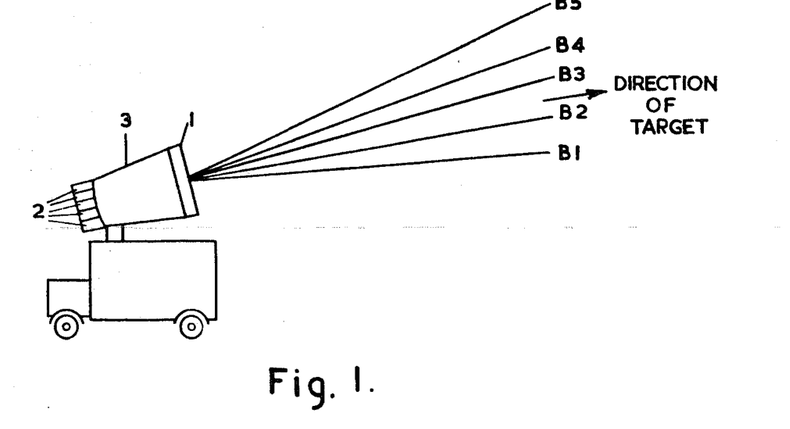
FIG. 1 shows diagrammatically a general arrangement of multi-beam echo-detecting means used in performing the invention.

FIG. 1 shows schematically a multi-beam pulse radar receiver in which an 8 ft. lens 1 is mounted with 5 vertically coplanar receiving horns 2 behind it. Five receiver beams B1–B5 at elevations of say 5°, 8°, 11°, 14° and 17° are thus produced giving a total cover in the same vertical plane of 3° to 19°.

Figure 2:
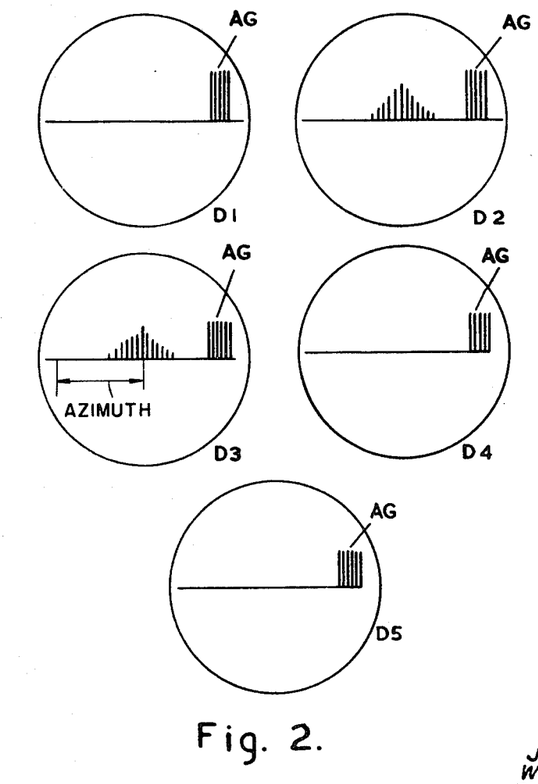
FIG. 2 shows a multi-beam display obtained with the arrangement of FIG. 1.

Each horn 2 is connected to its own receiver (not shown). The complete horn 2 and lens 1 assembly is arranged in known manner to rotate in azimuth. The pulse outputs of the 5 receivers associated with the beams B1–B5 are each displayed as amplitude-azimuth displays on different cathode ray tubes, D1–D5, (FIG. 2). The displays D1–D5 being of the azimuth-amplitude type and, with a target midway in elevation between beams B2 and B3 for example, equal responses are obtained on displays D2 and D3 as shown in FIG. 2 as the target and the beams pass through one another during azimuthal rotation of the horn 2 and lens 1 assembly. Thus from comparison of the amplitudes of the displayed signals the elevation of a given target is obtained.

Those to whom this specification is addressed will realise that the overall gains of the receivers corresponding to beams B1–5 must be constant and equal. This equality is most conveniently achieved by arranging to inject into each receiver a series of pulses so timed that they do not interfere, when displayed on the displays D1–5, with the displayed signals. These signals are shown at AG in FIG. 2; the receiver gains are adjusted from time to time to maintain these responses of equal amplitude. Automatic means to do this can be arranged if desired.

If it is assumed that the response curves of the receiver beams are triangular in shape a simple formula may be derived for obtaining target elevation from the amplitudes of the displayed signals.

Figure 3A:
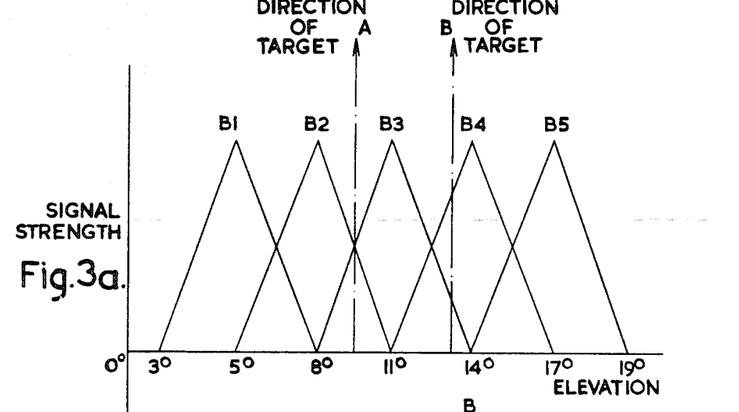
FIG. 3 shows theoretical beam response curves used in an analysis of the operation of the arrangement of FIG. 1.
Figure 3B:
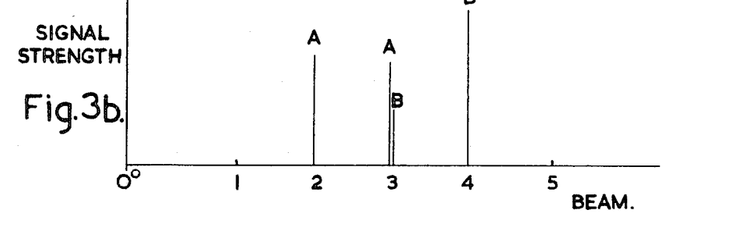

In FIG. 3a, a signal strength-elevation graph shows the assumed triangular response of the five beams B1–B5. A target of elevation 9½° in the direction A will produce signals in the outputs of receivers corresponding to beams B2 and B3 as shown at A in FIG. 3b. Since an elevation of 9½° corresponds to the mid-point between the maximum of beams B2 and B3 the signals are equal. A target of elevation 12½° in the direction B will produce signals in the outputs of receivers corresponding to beams B3 and B4 as shown at B. Since the elevation is nearer to that of B4 than B3, the signal from beam B4 is larger than the signal from beam B3.

For receiver beams having such a triangular response the elevation is given by $$E = \frac{Vb}{Va+Vb}$$

where $Va$ and $Vb$ are the signals from any two adjacent beams, $a$ and $b$, and E is the elevation measured in units of the separation between the two beams. It will be seen that when $Vb=0$ i.e. the elevation corresponds to the centre line of the beam $a$, the elevation is zero, i.e. on the centre line of beam $a$ and, when $va=0$, $V=1$, i.e. the elevation corresponds to the centre line of beam $b$, the elevation is unity, i.e. on the centre line of beam $b$.

Figure 4:
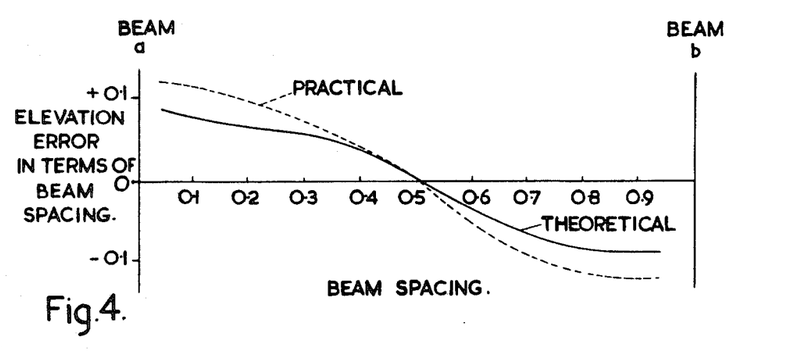
FIG. 4 shows practical and theoretical error curves appertaining to the analysis referred to above.

Because the assumption of triangular beam response is not strictly accurate, a certain error is unavoidable. This has been calculated for a typical case and is shown in FIG. 4 as it occurs between the centre lines of two similar beams $a$ and $b$. Elevation error in terms of fractional beam spacing is plotted against beam spacing expressed as a fraction and the calculated error curve is shown in full line as THEORETICAL.

An additional error also occurs in the measuring of actual values of $Va$ and $Vb$ from displays such as those of FIG. 2. This error is shown on the dotted curve of FIG. 4. It has been shown that it is immaterial whether the signals on each display are summed first and the sums then compared or, whether the signals are compared one by one and an average taken of the resulting individual elevations.

If, due to the actual shape of the response curves, a signal is obtained on beam B3 say with equal signals each side on beams B2 and B4 for the case when the target is aligned along beam B3, a further source of error is apparent unless allowance is made for both these side signals. (It will be remembered, for instance, that the original formula for the triangular case could only take two signals into account.) In this case, if the beam B3 and B4 signals only were considered, the conclusion would be drawn that the target was at an elevation on the beam B4 side of beam B3.

Figure 5:
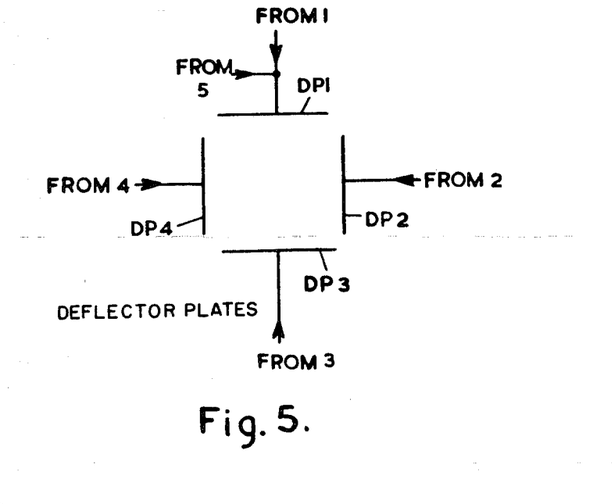
FIG. 5 shows an arrangement of the deflector plates of a cathode ray tube switch used in the invention.
Figure 6:
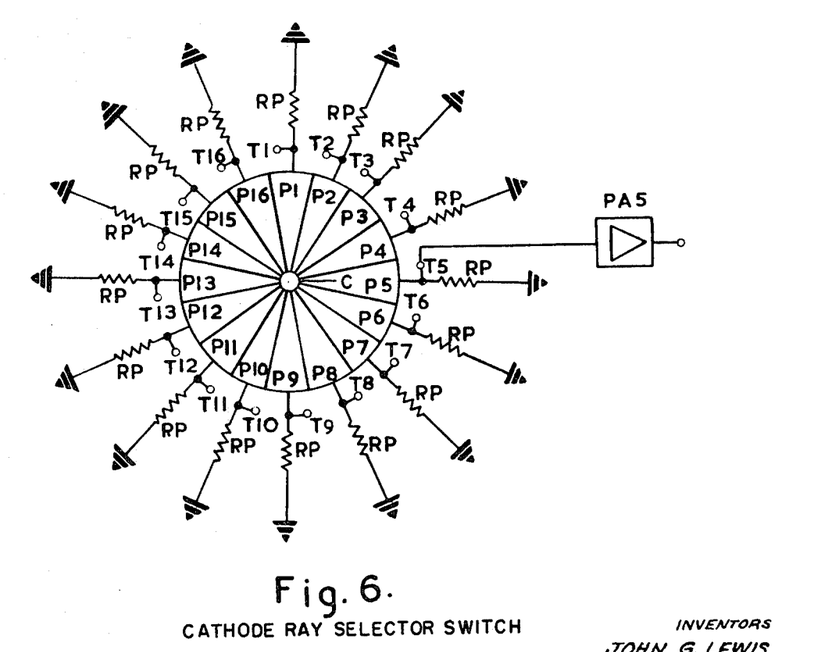
FIG. 6 shows an arrangement of screen sector plates in the cathode ray tube switch.

In order to overcome these and other errors as far as possible a preferred comparison means is provided which comprises a cathode ray tube switch of particular construction and arrangement. Referring now to FIGS. 5 and 6 the cathode ray tube deflecting plates DP1, DP2, DP3 and DP4 are connected via amplifiers to the receivers corresponding to beams B5 and 1, B2, and B4 respectively as shown, and the screen of the tube comprises sixteen sectoral plates P1–16 with a small separate disc plate C at the centre connected to earth. A suppressor grid of ⅜ inch mesh is placed on the gun side of the sector plates so that it extends over their total area. In operation it is maintained at a potential of −200 volts.

With no signals coming from the receivers coresponding to beams B1–5 the cathode beam is held by a suitable potential on the small separate centre disc plate C but when signals are presented from the beams onto the deflector plates DP1–4 the beam is deflected onto one of the sector plates P1–16 according to the comparative values of the signal amplitudes. For instance signals from receivers corresponding to beams B1, B2, B3, B4 or B5, alone will deflect the beam so that it falls on sector plate P1, P5, P9, P13 or P1 respectively. Equal signals, from say, receivers corresponding to beams B2 and B3, will deflect the beam so that it falls on sector plate P7, and so forth. A signal corresponding to beam B2 larger than a signal corresponding to beam B3 will deflect the beam so that it tends to fall on sector plate P6. In this way interpolation is achieved in elevation between the five beams B1–5 and altogether sixteen elevation zones are formed in which a target may be located.

In a preferred arrangement the response curves in elevation of the beams B1–B5 are arranged so that they are approximately a half sinewave. Thus the angle between the direction of the deflection of the beams and the median of the sector plate P1 is approximately proportional to the elevation angle between the direction of the target and the centre of beam B1.

Figure 7:
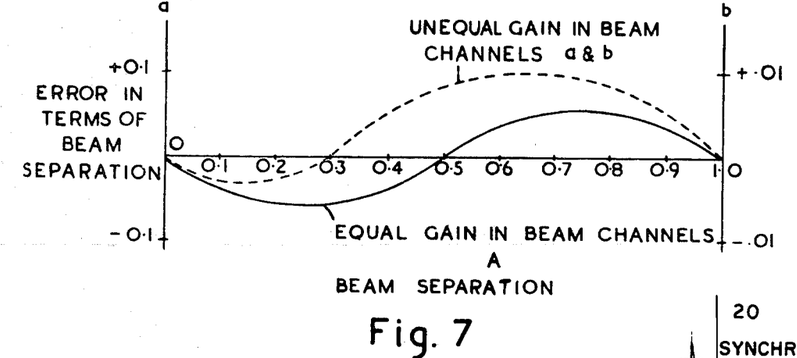
FIG. 7 shows errors to be expected when using the cathode ray tube switch.

The error curve for such an arrangement, assuming a linear calibration of the cathode ray tube deflection, has been calculated and is shown in FIG. 7. The second curve shown dotted in FIG. 7 illustrates the variation to be expected when the gain of one channel $b$ is 20% greater than the gain of the other channel $a$.

Each of the sector plates P1–16 is connected to earth via a 1000 ohm resistor RP so that a small signal appears on one of the terminals T1–16 according to which of the sector plates P1–16 the cathode beam encounters when deflected. This signal is of the order of 25 millivolts and so it is amplified to a level of about 30 volts by means of one of the amplifiers PA1–16 connected to the appropriate one of the terminals T1–16. (Only one of the amplifiers PA1–16 is indicated in FIG. 6.)

It will be apparent that an ambiguity is possible owing to the connection of the outputs of the receivers corresponding to beams B1 and B5 to the same deflector plate DP1. Without modification this arrangement has the disadvantage that it is not possible to know whether a deflection of the beam to encounter sector plate P1 is due to a target at the elevation of beam B1 or beam B5.

Two circuits are used to obviate this difficulty one which choses the larger of the two signals presented to the deflector plate DP1 and the other which routes the signal appearing on sector plate P1 over one or the other of two routes accordingly as there is a signal at the same time in the receiver corresponding to beam B1 or in the receiver corresponding to beam B5.

Figure 9:
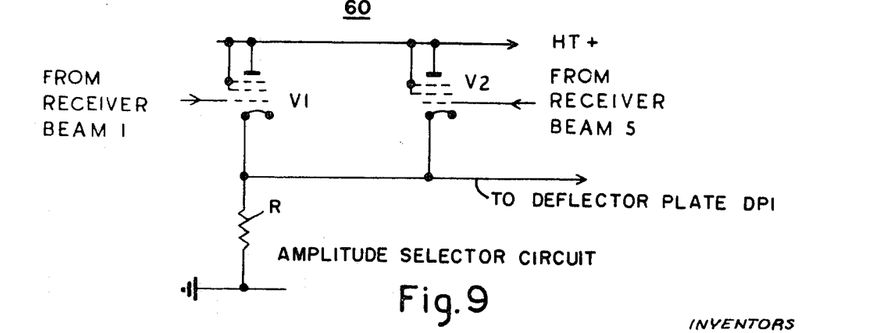
FIG. 9 shows a signal amplitude selector circuit used in the invention.

The first of these two circuits is shown in FIG. 9, designated generally by numeral 60, comprises two valves V1 and V2 common-coupled at their cathode by a resistor R. For convenience the valves V1 and V2 are pentode valves with their suppressor and screened grids strapped to the anode to form triodes. The outputs of the receivers corresponding to beams B1 and B5 are connected to the grids of valves V1 and V2 respectively and the largest of these two outputs appears across the common cathode coupling resistor R and feeds from there to deflector plate DP1.

The second of the two circuits mentioned above will now be described with reference to an arrangement for height zoning in which the elevation zoned signals on the sector plates P1–16 are used and in which resolution of the ambiguity between the signals on deflector plates DP1 and DP5 is achieved.

Figure 8:
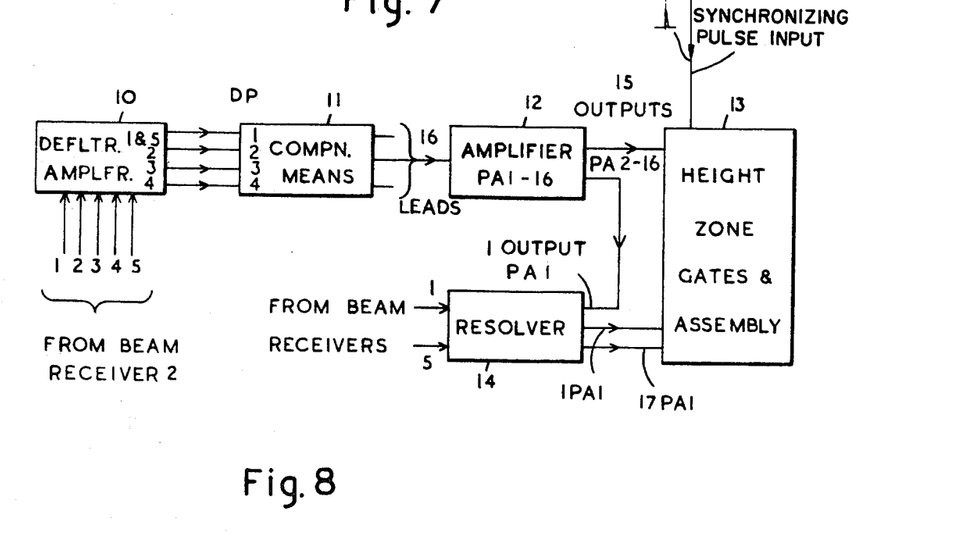
FIG. 8 shows a block diagram of apparatus used in the invention.

In FIG. 8 the outputs of the receivers corresponding to beams B1–B5 are fed to a deflector amplifier 10 which includes a circuit according to FIG. 9 to reject the smaller of the signals from the receivers corresponding to beams B1 and B5. The four outputs from the deflector amplifier 10 are fed, as described above, to the cathode ray tube comparison means 11. The sixteen output leads from the comparison means 11 are connected, of course, to the sector plates P1–16 of the cathode ray tube and feed to the sixteen amplifiers P1–16 shown in block 12.

Now in order to determine the height zone of the target to which a given signal corresponds a height zone (gates and assembly) means 13 is used together with a resolver means 14 which resolves to ambiguity referred to above. The output from sector plate P1 is fed via its amplifier PA1 to the resolver means 14 which comprises two gates controlled by signals from the receivers corresponding to beams B1 and B5 respectively. When a signal due to beam B1 is received over output PA1 a gate is opened by the signal in beam B1 to allow this signal to pass to the height zone means 13 over lead 1PA1 and, when a signal due to beam B5 is received over output PA1 another gate is opened by the signal in beam B5 to allow this signal to pass to the height zone means 13, over lead 17PA1. Thus seventeen channels corresponding to seventeen different elevation zones connect between the cathode ray switch or comparison means 11 and the height zone means 13. Effectively therefore the five beams at 3° spacing are converted into seventeen beams at ¾° spacing.

Figure 10:
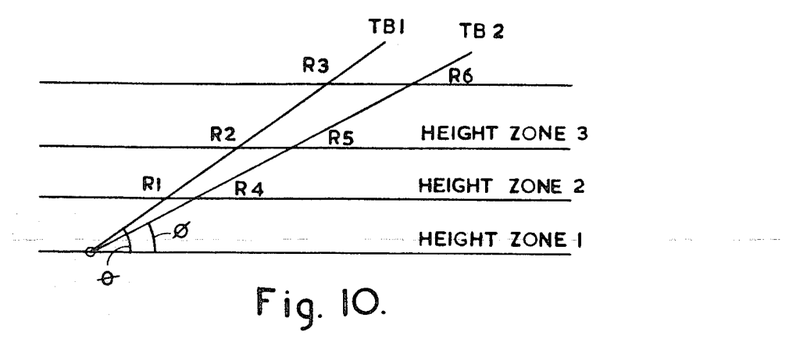
FIG. 10 shows the theoretical basis of the derivation of height zones from elevation and range zones.

Now referring to FIG. 10 it will be easily seen that a typical beam TB1 at an angle $\theta$ can be divided into range zones 0–R1, R1–R2, R2–R3 which correspond to the height zones 1, 2 and 3 respectively. Similarly a second beam TB2 at an angle $\phi$ can be divided into range zones 0–R4, R4–R5, R5–R6 which also correspond to the same height zones 1, 2 and 3 respectively as before. In other words by gating into suitable range zones the signals due to each beam, or more accurately each sub-beam, it is possible to allocate such signals to the appropriate height zone. A different group of range zones is required for each sub-beam, of course.

Figure 11:
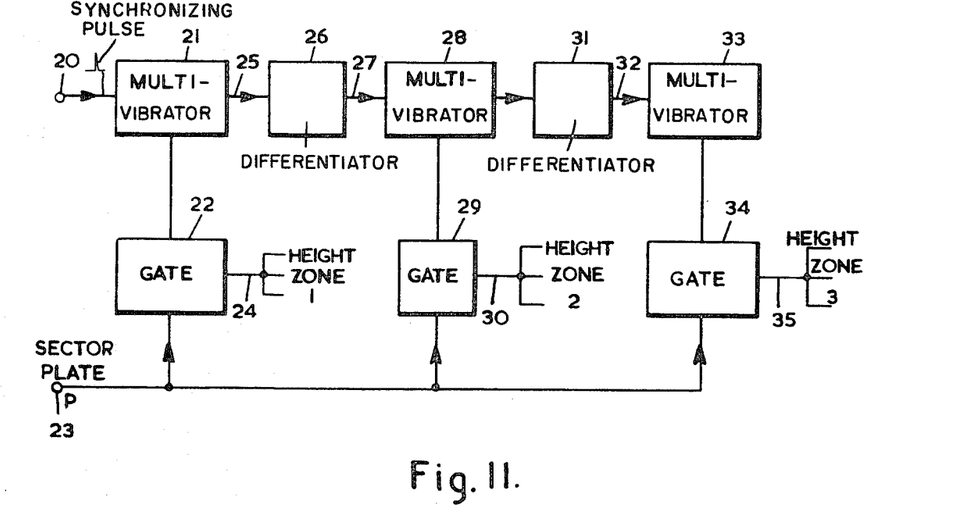
FIG. 11 shows a gating arrangement used in the derivation of height zones in the invention.

The height zone means 13 performs these range zone gating functions for signals of each of the seventeen effective sub-beams, routes the signals from each sub-beam according to their appropriate height zone and so finally reassembles the signals for display. The display means can be of any convenient type, for instance a range time-base can be allocated to each height zone and the signals displayed on the appropriate one as range indications. A detailed block schematic of one of the gating sections of the height zones means 13 is shown in FIG. 11. One such section allocates the signals, from one effective sub-beam only, to the appropriate one of three height zone outputs. The height zone outputs of all such sections are then added together.

A synchronizing pulse signal is applied at terminal 20 from a convenient synchronising source and actuates the monostable multivibrator 21 which feeds a signal to the gate 22; the gate 22 opens and remains open until the multivibrator 21 restores. The restoring time of the multivibrator 21 is adjusted to correspond to the range zone corresponding to the height zone 1 for the mid point of the elevation zone represented by the sub-beam. Signals from a sub-beam channel are applied to terminal 23 and signals appropriate to height zone 1 are thus fed via terminal 23 and the gate 22 to the height zone 1 output lead 24.

When the multivibrator 21 restores the gate 22 closes and a signal is passed over lead 25 to a differentiating circuit 26 which produces a signal on lead 27 suitable for the operation of a second monostable multivibrator 28. Operation of multivibrator 28 opens a second gate 29 which routes signals from terminal 23 to height zone 2 output lead 30. Here, the gate 29 remains open for a period corresponding to a range zone for height zone 2 on the sector plate P and is then closed by the restoration of the multivibrator 28. As before the restoration of the multivibrator 28 passes a signal to a (second) differentiating circuit 31. This is connected by a lead 32 to a third monostable multivibrator 33 which controls the opening and closing of a third gate 34 to give access to height zone 3 output on lead 35 for signals from terminal 23. A similar gating circuit is used for each sub-beam, its multivibrator restoring periods being adjusted to give the range zones required for each elevation according to the required height zones (see FIG. 10). The height zone outputs for each height zone (in this case 1, 2 or 3) from the gating circuits are added together and displayed on three separate height zone displays.

Figure 15:
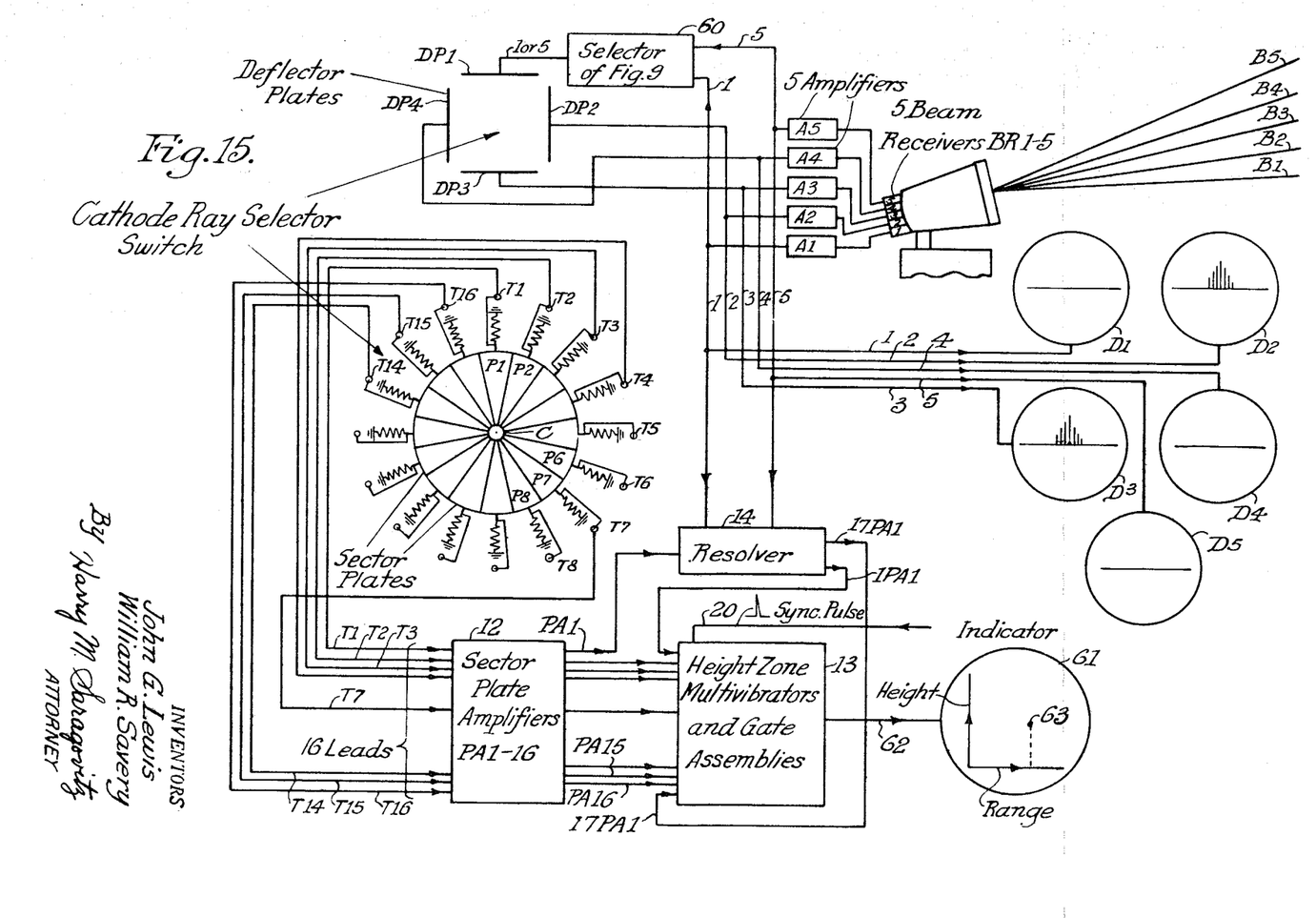

The elevation and height determining means of the invention is shown in the general diagram FIG. 15 which shows the relations of all the components previously described organized into a complete system. The components included are those shown in FIGS. 1, 2, 5 and 6, 8, 9 and 11. The ambiguity "Resolver" 14 is described generally hereinbefore but not shown in detail in the drawings as being within the skill of the art.

Assuming as before that the elevation of the echo reflecting target lies between beam receiver channels B2 and B3, signals of equal intensity will be received on receivers BR2 and BR3 and after passing through amplifiers A2 and A3 are applied to deflecting plates DP2 and DP3 of the cathode ray selector switch. The amplified received signals are made positive so that the electron beam is attracted equally toward both said plates, the resultant causing the beam to fall on sector plate P7. The selection of the proper sector plate is independent of signal amplitude; the selection of sector plate P7, for example, being dependent only on the *equality* of the signals applied to deflecting plates DP2 and DP3. The signal output from the sector plate intercepting the electron beam is constant and entirely independent of the echo signal strength, being the potential drop across a sector plate resistor due to the passage of the electron beam current to ground, and amounting to about 25 milli-volts as stated above. The duration of the sector plate signal is the same as that of the echo signal, being of the order of one microsecond.

The pulse signal from sector plate P7 is routed from terminal T7 to plate sector amplifier PA7 within block 12, which amplifies the signal to about 30 volts. This amplified pulse signal is then routed to channel 7 height zone multivibrator and gating chain within block 13 which contains 17 timing and gating chains like that shown in FIG. 11 and described in connection therewith.

When the transmitter (not shown) associated with the receiving system, but not part of the present invention, emits a radio pulse, a synchronizing pulse is applied to terminal 20 of each of the 17 multivibrator chains and simultaneously starts the multivibrator timed sequence in all 17 chains, each chain being connected to the sector plate corresponding to the sub-beam channel to which it belongs, such as P7 of our example. The height zone multivibrators connected to sector plate P7 are timed to measure off time intervals equal to the time required for a radio signal to go and return over the path of sub-beam 7 intercepted by one height zone as shown on diagram FIG. 10. Thus at the instant the transmitter emits a radio pulse, the synchronizing trigger signal starts the multivibrators of all 17 chains to measure off their appropriate time intervals as the radio pulse propagates along the region marked out by the 17 sub-beam channels. As this radio pulse passes through the height zones successively a multivibrator is tripped in each sub-beam channel marking off its appropriate time interval and opening a gate during the passage of the radio pulse through the next height zone.

If a reflecting target exists in any one of the height zones, and also within the region marked off by a sub-beam channel, say 7, an echo signal will be reflected back to the receiving system delayed by the time interval required to go and return from the target in sub-beam 7. At this instant the echo signal is routed *only* through sector plate 7 to height zone multivibrator chain 7 sector plate terminal 23, where only one of the height zone gates is open. If the target is in height zone 2, the second zone multivibrator 28 will have tripped and second height zone gate 29 of sub-beam 77 will be open and the echo signal routed to cathode ray indicator tube 61 by conductor 62 which momentarily unblocks the intensity grid of the tube at a time corresponding to the slant range of the target. The indicator display may be arranged with a horizontal time base deflection giving slant range and a vertical coordinate giving height or any other preferred type of display. For the range-height display shown, gate 29 applies the height zone 2 potential to the vertical deflecting plates. Thus, at the instant the echo signal arrives, the proper height zone potential has already been applied and the time sweep range potential is correct for the slant range of the target at the instant the echo signal unblocks the intensity grid, giving the target position 63.

The echo signals are also shown on the face of cathode ray indicators of FIG. 2 shown also in FIG. 15. The echo signal along sub-channel 7 develops equal signals in horn channels B2 and B3 as described in connection with FIG. 2 giving the equal azimuth-amplitude displays on tubes D2 and D3 as shown.

In setting up a system of the kind described above it is convenient to be able to make tests and measurements to verify the accuracy of operation of the various parts of the system.

For instance, in setting up the cathode ray tube switch a microammeter is connected in series with the earth connection to the collector plate C. With the undeflected beam held by the collector plate C the microammeter measures the beam current which can be adjusted in known manner to the correct value. The sector plates P1–16 of the cathode ray tube are coated with fluorescent material on the side nearer the gun and thus the beam deflection may be measured during operation by observing the position of the resulting bright spot. Rings concentric with the collector plate C and drawn on the sector plates P1–16 enable the position of the spot to be estimated to the required degree of accuracy.

Figure 12:
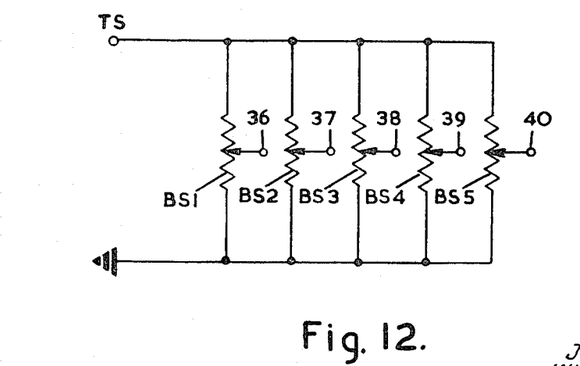
FIG. 12 shows the electrical circuit of a beam simulator used in tests of apparatus, FIGS. 13a and b shows views of mechanical arrangements of elements of the circuit of FIG. 12.

To test the action of the deflector plates DP1–4 of the cathode ray tube switch a beam simulator is provided. The electrical circuit of the simulator is shown in FIG. 12 in which five potentiometers, BS1–5 are connected in parallel between a terminal TS and earth whilst the moving arms of the potentiometers BS1–5 are connected to terminals 36, 37, 38, 39 and 40 respectively. Terminals 36–40 are respectively switched, under test conditions, to the five inputs of the deflector amplifier 10 (FIG. 8) corresponding to the receivers of beams B1–B5. A series of test pulses applied to the terminal TS will produce at the inputs to the deflector amplifier 10 signals, determined by the setting of the potentiometers BS1–5, corresponding to the signals normally obtained from beams 1–5.

Figure 13:
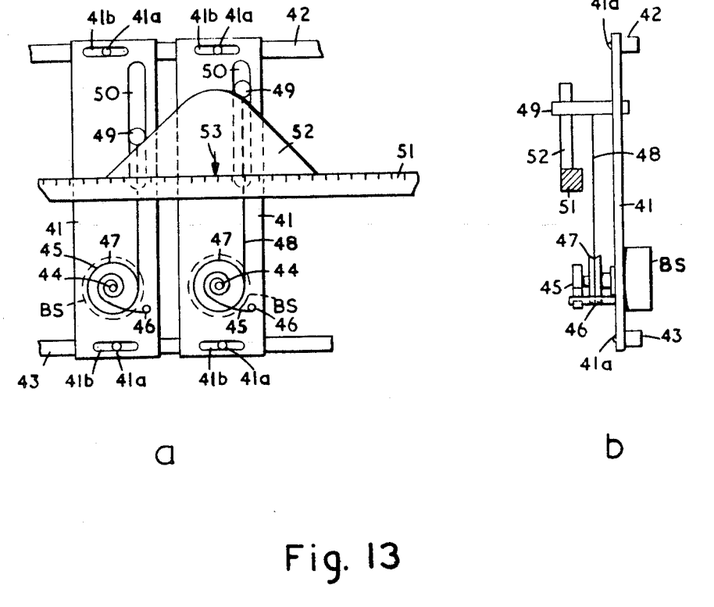

The potentiometers BS1–5 may be set by hand or by means of a mechanism as shown in FIGS. 13a and (b). In these figures potentiometers BS are mounted on plates 41 which are adjustably mounted by screws 41a in slots 41b on a pair of rails 42 and 43. In the front elevation of FIG. 13a only two of the plates 41 with their potentiometers BS are shown although in the complete mechanism, to correspond with the electrical circuit of FIG. 12, five potentiometers BS are, of course, required. The principle of the mechanism and its operation will be readily apparent from the description of the two shown in FIG. 13a. The shafts 44 of the potentiometers BS are continuously urged by the spiral springs 45 for the moving arms to be at the earthy ends of the potentiometer windings. The springs 45 are connected between the shafts 44 and the posts 46 secured to the plates 41. A pulley 47 is also mounted on the shaft 44 of each potentiometer BS and carries one end of a wire 48 the other end of which is fastened to a rod 49. The continuous urging of the spring 45 tends to cause the pulley 47 to wind the wire 48 round it and so the rod 49 which moves in the slot 50 in the plate 41 is continually pulled along the slot 50 towards the potentiometer BS. A scale 51 runs parallel between the rails 42 and 43 and limits the movement of the rods 49 which are pulled down in their slots 50 onto the scale 51.

A half-sinusoidally shaped cam 52 is arranged to slide along the scale 51 and in so doing forces the rods 49 upwards from the scale 51 as it passes along. This action is clearly seen in progress in FIGS. 13a. The appropriate potentiometers BS rotate against their springs 45. It can be easily seen that the outputs of the appropriate potentiometers BS will then represent the signals obtained from the beams B1–5 with the half-sinusoidal response curves of the preferred arrangement described above. The elevation of the target will correspond to the setting of centre mark 53 on the cam 52. Test signals corresponding to different target elevations are therefore obtained by setting the mark 53 of the cam 52 against the appropriate part of the scale 51.

By feeding a variable delay pulse into the terminal TS of the beam simulator circuit, range variation may also be simulated. This can be arranged using known sources of pulses in which the pulse delays may be adjusted.

Figure 14:
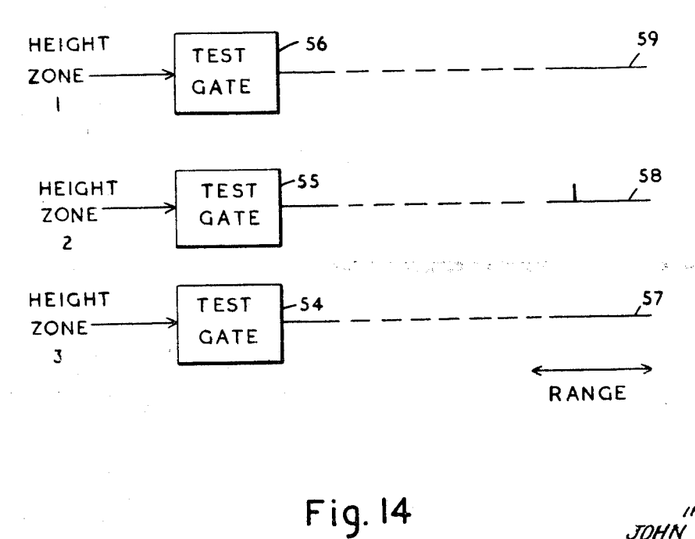
FIG. 14 shows a gating arrangement used in tests in connection with the invention.

Furthermore, the height zone gates may also be tested at the same time since variation of range will cause variation of height according to the elevation of the target. An additional check on the action of the height zone gates is provided by means of the arrangement shown diagrammatically in FIG. 14. The outputs from the three Height Zones 1, 2 and 3 are each applied through different Test Gates 54, 55, 56 to monitor range displays 57, 58, 59 respectively. The test gates 54, 55 and 56 are arranged to be open during successive pulses. Any signal coming through corresponds to one range and elevation only, and hence to only one height zone, so there should be only one display during the successive pulses if the gates of the height zone 1, 2 and 3 are operating correctly. For economy of equipment, arrangements can be made if desired, for the same cathode ray tube to be used to display the monitor range displays 57, 58 and 59. The manner in which this may be done will be apparent to those skilled in the art and need not be discussed further herein.

In those cases where it is required to obtain a complete PPI presentation of all the signals incoming via the five beams, a combining circuit similar to that of FIG. 9 is used except that five valves are provided, with a common cathode-resistor R. The five receivers corresponding to beam B1–5 are each connected to the grid of a different valve. The output voltage for application to the PPI is obtained, as before, from across the common cathode resistor R. It should also be noted that the same circuit can be used for mixing the signals from the beams as before but with the first 50,000 yards or so, of the beam blanked out by a suitably timed suppression signal to give a very marked reduction in clutter.

An alternative method of carrying the invention into effect is envisaged in which the sector plates P1–16 of the cathode ray tube switch are dispensed with and a cathode ray tube of the normal fluorescent screen type is used. The screen is again divided into 16 sectors but in this case by the use of suitable shields. Each shielded sector is viewed separately by a different photoelectric cell the output of which, it will be appreciated, now corresponds exactly with that across one of the sector plate resistors RP previously described. Thus the essential elevation sub-zoning of the signals is achieved. Further development of the arrangements follows that already described when using sector plates.

In another way of carrying the invention into effect the output of a receiver corresponding to a range elevation channel is applied to three gates timed according to three ranges corresponding to the three required height zones. Each receiver output is divided according to a different set of gates which are each timed for height zones in the elevation channels in which the particular receiver operates. Thus, the output of the receivers is divided according to height zones without the interim step of division into elevation sub-zones. This reduces the accuracy somewhat but may be adequate for some purposes.

We claim:

1. A system for determining the direction of a target object reflecting radiation from a radio pulse transmitter comprising, a plurality of directional horn having equally spaced elevational directions of maximum sensitivity forming receiving channels and having echo-detecting means connected thereto rotatable as a unit about a vertical axis, signal comparison means including a plurality of cathode ray tubes having amplitude-azimuth displays responsive to the respective echo-detecting means, and a cathode ray selector responsive to signals from said horn-formed channels having sector plates positioned to intercept the electron beam thereof and adapted to sub-divide said horn-formed channels into sub-channels, whereby the position of a target may be located in the horn-formed channels from the indications of said cathode ray tubes and in one of the sub-channels by the response of said cathode ray selector.

2. A device having the structure of claim 1 wherein said comparison means includes means for injecting test pulses having constant known delay into each echo-detecting means and means for displaying said test pulses as an amplitude display on each said cathode ray tube, whereby adjustment of the gain of the individual echo-detecting means to maintain equal gains may be performed by reference to the pulses displayed for each channel.

3. A device having the structure of claim 1 wherein the comparison means comprises means for comparing the relative amplitudes of the echo signals signal-by-signal over a group and means for averaging the values of elevation obtained over the group of signals.

4. A device having the structure of claim 1 wherein the comparison means comprises means for comparing the sums of the amplitudes of the echo signals summed through a group of signals whereby the elevation is determined from the relative value of these signals.

5. A system for determining the elevation of a target reflecting radiation from a radio pulse transmitter comprising, a plurality of radio directional channel forming horns mounted vertically one above the other rotatable as a unit about a vertical axis and having axes of maximum response equally spaced in elevation defining a plurality of elevational range channels, echo-detecting means connected to each horn and a cathode ray selector responsive to signals from said horn-formed channels having sector plates positioned to intercept the electron beam thereof and adapted to sub-divide said horn-formed channels into sub-channels, whereby a target object may be located in one of the sub-channels by the response of said cathode ray selector.

6. A system for determining the direction of a target reflecting radiation from a radio pulse transmitter comprising, a plurality of directional echo-detecting means each having a different elevational direction of maximum response rotatable as a unit about a vertical axis, elevation channel selector means including a cathode ray tube having a plurality of deflecting plates assembled symmetrically about the axis of the tube, each connected to one of said directional echo-detecting means and a plurality of metal sector plates within said tube arranged symmetrically around said axis and in a plane at right angles thereto, each sector plate adapted to act as a collector plate and produce a signal when bombarded by the cathode beam, whereby the direction of said beam is determined by the resultant of the relative values of the echo signals applied to said deflecting plates and the signal appearing on a given sector plate indicates that the target is in the elevational channel corresponding to said sector plate.

7. A system for determining the direction of a target object reflecting radiation from a radio pulse transmitter comprising, a plurality of radio directional horns mounted vertically one above the other and rotatable as a unit about a vertical axis, each horn defining a reception channel having an elevational direction of maximum response, said channels having mutually overlapping directional patterns providing a plurality of elevational sub-channels, echo-detecting means connected to each horn, a cathode ray selector switch having a plurality of deflecting plates connected to appropriate echo-detecting means, and a plurality of metal sector plates arranged symmetrically around the axis of the tube whereby the cathode beam is deflected rotationally around said tube axis through an angle proportional to the elevation angle of the target above the axis of the lowest horn, and a signal appearing on a given sector plate indicates that the target is in the elevational channel corresponding to said sector plate.

8. The device defined in claim 7 wherein five echo-detecting horns are provided having axes of maximum response equally spaced in the elevational plane defining five elevation channels, and wherein said cathode ray selector switch includes four deflecting plates, the first and fifth echo-detecting means being connected through a signal-amplitude selector to a first deflecting plate depending on which channel has the stronger signal and second, third and fourth echo-detecting means are connected in order of elevation to the second, third and fourth deflecting plates.

9. The device defined in claim 8 for indicating the direction, height and range of a target which includes, a range zone gating system having a chain of gating circuits for each elevation sub-channel so timed as to subdivide said channel into range zones corresponding with predetermined height zones, each chain of gating circuits being connected to an appropriate sector plate of said cathode ray tube selector switch, a plurality of cathode ray indicator tubes having range-amplitude displays one tube being provided for each height zone and connections from all the gating circuits corresponding to one height zone to the corresponding indicator tube and connections from echo-detecting means of appropriate elevation channels to the corresponding elevational gating circuit chain, whereby the echo signals received from a target object in the elevation channels are gated into the cathode ray indicator tube corresponding to the height zone in which the target is found and displayed at a point corresponding to the slant range of the target.

10. A system for determining the direction, range and height of a target object as defined in claim 8 and including, a plurality of elevation sub-channel multivibrator chains each chain connected to an appropriate sector plate of said cathode ray tube selector switch, the time delay of the multivibrators corresponding to the time of radio propagation in range along said elevation sub-channels through a predetermined series of height zones, a plurality of height zone gating circuits connected to their respective multivibrators and adapted to pass echo signals to height zone indicators, said height zone indicators comprising cathode ray tubes one for each height zone each having a range-time base and a signal-amplitude display, and connections from the appropriate elevation channel echo-detecting means to said height zone gating circuits respectively, whereby echo signals from target objects are displayed in range on the appropriate height zone indicators.

11. A system for determining the direction of a target reflecting radiation from a radio pulse transmitter comprising a plurality of directional echo-detecting means having axes of maximum response equally spaced in elevation and having mutually overlapping directional patterns providing a plurality of elevational sub-channels said directional means being assembled as a unit and rotatable about a vertical axis, a cathode ray tube elevation indicator having a plurality of deflecting plates connected to appropriate echo-detecting means and a fluorescent screen divided into a plurality of equal sectors disposed symmetrically about the axis of the tube each sector corresponding to an elevation sub-channel, whereby the cathode beam is rotated about the axis of the tube by an angle proportional to the elevation of the target and the illumination of a sector by the cathode beam indicates the elevation channel in which the target is found.

12. A device having the structure as defined in claim 11 which includes a photoelectric tube associated with each said fluorescent sector, and a shield associated with each said tube to prevent being excited by radiation from adjacent sectors whereby the elevation of the target is indicated by a photoelectric signal from a sector excited by the cathode beam.

References Cited

UNITED STATES PATENTS

| | | | |
|---|---|---|---|
| 2,426,183 | 8/1947 | Delvoraine | 343—16 |
| 2,433,369 | 12/1947 | Kandoian | 343—16 |
| 2,433,332 | 12/1947 | Benioff | 343—11 |
| 2,449,976 | 9/1948 | Busignies | 343—11 |

RODNEY D. BENNETT, JR., Primary Examiner

M. F. HUBLER, Assistant Examiner

U.S. Cl. X.R.

343—13, 16